United States Patent
Cheston, III et al.

(10) Patent No.: US 7,031,438 B1
(45) Date of Patent: Apr. 18, 2006

(54) SYSTEM FOR OBTAINING FORWARDING INFORMATION FOR ELECTRONIC SYSTEM USING SPEECH RECOGNITION

(75) Inventors: Frank C. Cheston, III, Potomac, MD (US); Patricia V. Hatton, Laurel, MD (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 09/193,249

(22) Filed: Nov. 17, 1998

Related U.S. Application Data

(63) Continuation-in-part of application No. 09/057,369, filed on Apr. 9, 1998, now Pat. No. 6,330,308.

(51) Int. Cl.
*H04M 11/00* (2006.01)

(52) U.S. Cl. .............................. 379/88.14; 379/88.23; 455/414.4

(58) Field of Classification Search ............. 379/88.22, 379/88.25, 93.18, 201.07, 201.08, 67.01, 379/94, 88.01, 88.02, 88.03, 88.04, 88.23, 379/88.24, 88.26, 88.27, 100.13, 88.13, 88.17, 379/88.18, 100.16, 100.15, 88.28
See application file for complete search history.

(56) References Cited

U.S. PATENT DOCUMENTS

| | | | |
|---|---|---|---|
| 4,652,700 A | | 3/1987 | Matthews et al. |
| 4,856,066 A | * | 8/1989 | Lemelson ................ 379/88.01 |
| 5,008,926 A | | 4/1991 | Misholi |
| 5,181,237 A | * | 1/1993 | Dowden et al. ......... 379/88.01 |
| 5,193,110 A | * | 3/1993 | Jones et al. ............. 379/88.01 |
| 5,204,894 A | | 4/1993 | Darden |
| 5,239,577 A | * | 8/1993 | Bates et al. .................. 379/201 |
| 5,479,488 A | * | 12/1995 | Lennig et al. ........... 379/88.04 |
| 5,553,119 A | | 9/1996 | McAllister et al. |
| 5,586,177 A | | 12/1996 | Farris et al. |
| 5,631,948 A | | 5/1997 | Bartholomew et al. |
| 5,638,425 A | * | 6/1997 | Meador, III et al. .......... 379/88 |
| 5,870,454 A | * | 2/1999 | Dahlen .................... 379/88.14 |
| 6,072,862 A | * | 6/2000 | Srinivasan ............... 379/88.13 |

\* cited by examiner

*Primary Examiner*—Fan Tsang
*Assistant Examiner*—Gerald Gauthier
(74) *Attorney, Agent, or Firm*—Leonard C. Suchyta, Esq.; Joel Wall, Esq.; Rader Fishman & Grauer PLLC

(57) ABSTRACT

A unified message platform system integrates voice recognition and dialing capabilities with directory systems, including automated telephone directory systems and private database directory systems, to enable a user to access stored directory information related to an intended recipient of a message. The unified message platform system prompts the user to speak the name of the party intended as the recipient of a message, and the type of address information to be accessed, for example fax number, e-mail address, home address, etc. The unified message platform system analyzes the input speech information, determines the appropriate database to be accessed, and accesses either local directory databases, or remote directory databases via a local area or wide area packet switched network. For remote directory databases such as private corporate directory databases, the unified message platform system also interacts with the remote directory databases to ensure compliance with any security protocols of the remote directory databases. The unified message platform, upon obtaining the requested information, either announces the information in an audible format, or uses the requested information, for example to place a call to the station corresponding to the requested information.

43 Claims, 3 Drawing Sheets

SYSTEM FOR OBTAINING FORWARDING INFORMATION FOR ELECTRONIC SYSTEM USING SPEECH RECOGNITION

This application claims priority from and is a continuation-in-part of commonly assigned, U.S. patent application Ser. No. 09/057,369, filed Apr. 9, 1998 now U.S. Pat. No. 6,330,308.

TECHNICAL FIELD

The present invention relates to switched communications networks providing integrated messaging mail services, more particularly to a system and method for providing communication between voice mail systems, facsimile processing services, and other electronic mail systems using directory systems having speech recognition capabilities.

BACKGROUND ART

Messaging systems have evolved from basic voice mail systems to integrated services platforms that enable incoming callers to access not only voice mail systems, but other types of services, such as facsimile mail. Voice mail has become commonplace not only in business usage but also on an individual telephone service subscriber basis through service from a central office. A voice mail system is a specialized computer that stores messages in digital form on a disk. The voice is generally digitized, usually at a much slower rate than the 64 Kb/s signal the central office uses in its switching network. The digitized voice is compressed and stored on a hard disk that maintains the voice mail operating system, system prompts, and greetings, and the messages themselves. A processor controls the compressing, storing, retrieving, forwarding and purging of files. A comprehensive review of exemplary voice mail systems and voice messaging systems is disclosed in U.S. Pat. No. 5,631,948 to Bartholomew et al., the disclosure of which is incorporated in its entirety herein by reference.

The above-incorporated Bartholomew et al. patent discloses a system and method of effecting transfer of a message such as a voice message from one centralized messaging system to another centralized messaging system in a switched communications network having a plurality of central offices connected to subscriber terminals and connected together by trunks. Specifically, the transfer of the message by one centralized messaging system is effected through a common channel signaling network using the existing advanced intelligent network (AIN) implementation of public switched telecommunications networks in the United States. The disclosed voice messaging system provides caller to remote mailbox and/or mailbox to remote mailbox communication using TCAP and SS7 messaging in the AIN while blocking or obviating trunking of voice messages. The disclosed system uses existing voice mail equipment interfaced to the telephone network and that is fully responsive to TCAP and SS7 protocols. In particular, the voice mail system communicates with a service switching point (SSP), which in combination with a centralized node in the network, such as a Service Control Point (SCP), enable AIN services to be provided for the voice mail system.

According to Bartholomew et al., a caller desiring to leave a voice message in the mailbox of a remote person may use a telephone to access his own voice mail system and mailbox and to record the message. The voice processing unit of the mailbox may operate its voice menu to direct the caller to depress a specified key when satisfied with the message. The voice processing unit may then query the caller as to whether he desires to send the message and, if so, to depress another specified key. The voice unit then may instruct the caller as to the procedure for keying in the identity of the destination and to depress a further specified key to send the message. The message is digitized in conventional fashion and stored in the mailbox of the sender. The caller may go on hook after depressing the designated send key. The depression of the send key causes the generation of a tone or other signal which is recognized by the acting SSP as an AIN trigger. This local connection ends usage of the voice network.

The trigger causes the SSP to frame a TCAP inquiry message which is directed to the SCP for instructions. The TCAP message includes information identifying the calling station and mailbox and the called station and the fact that the caller is requesting mailbox to mailbox message transfer. The SCP consults its database to establish whether the caller is authorized to communicate mailbox-to-mailbox and as to the existence and identity of a mailbox for the called number. The SCP then originates a response to the SSP to dispatch one or more SS7 packets to the called directory number and mailbox along with an appropriate routing label and handling instructions and carrying as the included information in the SS7 packet the digitized voice retrieved from the mailbox of the sender. The information may be in T1 protocol which is conventionally the output digital signal of mailbox equipment regardless of manufacture.

Known voice mail systems such as disclosed in Bartholomew et al. are well adapted to efforts to network the voice mail systems. In particular, an organization known as The Message Alliance (TMA) has attempted to establish an open standard for voice mail systems. Work is underway to develop a set of standards known as Audio Message Interchange Service (AMIS) in the hope that when AMIS standards are approved, they will form a common language that network voice mail systems can support to enable communication between voice mail systems of different manufacturers.

In particular, TMA has proposed a voice mail messaging system where a subscriber having voice mail service dials into his or her voice mail system (the originating voice mail system), records a message, and inputs the telephone number (i.e., the destination telephone number) of the called party. The originating voice mail system forwards the message and the input telephone number to a protocol translator. The protocol translator is a node connected to the public switched telephone network and that has a first connection for communication with the originating voice mail system and a second connection dedicated to communication with a centralized database. The protocol translator, implemented for example using an IBM RS 6000 system, converts the message and the corresponding telephone number from the protocol used by the originating voice mail system to a protocol compatible with the centralized database (e.g., AMIS). The protocol translator sends the converted message and telephone number to the centralized database via the second dedicated connection using, for example, an Asynchronous Transport Multiplex (ATM) transport layer.

The proposed TMA database stores telephone numbers for all voice mail boxes for all voice mail systems in the TMA network. Hence, all service providers having voice mail subscribers will have the respective voice mail box information stored in the TMA database. Upon receiving a message from the protocol translator, the TMA database will retrieve necessary information for accessing the voice mail box for the called party based on the supplied telephone number, and supply routing information back to the protocol translator. The protocol translator, using the routing information, then initiates a line-sided connection with the public switched telephone network to establish a connection with a destination node serving the voice mail system for the called party.

The above-described voice mail systems, however, suffer from the disadvantage that a user of the voice mail system must manually key in the destination telephone number for the called party. In particular, the voice processing unit of the voice mail system is configured to detect the destination telephone number based on the sequence of DTMF signals generated during touchkey inputs by the user. Although tolerable by voice mail users who have unimpeded access to a telephone list and a touch-tone pad, this arrangement is not practical for users that do not recall a destination telephone number for a desired individual, or users that prefer "hands-free" operation that avoids the use of a touch-tone pad.

This problem is readily apparent for business travelers that need to check their voice mail messages while traveling. For example, a business traveler may access his or her voice mail box for messages, and discover an urgent voice mail message from a customer. Assume the business traveler wishes to reply to the voice mail message by calling back the customer, or wishes to forward the voice mail message to a colleague to request additional information related to the urgent voice mail message. If the business traveler does not recall the telephone numbers of the colleagues (or have their telephone numbers readily available), the business traveler will need to disconnect from his or her voice mail, access the appropriate directory assistance system to obtain the telephone number of the customer and/or colleague, record the telephone number supplied by the directory assistance system (e.g., by writing the number on a sheet of paper), disconnect from the directory assistance system, and call back the voice mail box to replay the message and manually input the telephone numbers obtained from directory assistance.

This problem exists even in conventional business and residential voice mail systems, where a voice mail subscriber having a voice mailbox on a private branch exchange or computer/answering machine wishes to reply or forward a message on his or her mailbox, and does not have the destination telephone number readily available. Voice mail systems typically have a "time-out" feature, where a voice mail subscriber is disconnected if no reply to a prompt is received by the voice mail system within a prescribed interval. Hence, if the voice mail subscriber attempts to place the voice mailbox on "hold" (e.g., by pressing hook/flash on his or her desk telephone) to access a directory assistance system, there is a risk that the voice mail system will disconnect if the subscriber does not return to enter the destination telephone number within a prescribed time interval.

Hence, voice mail users suffer the inconvenience of remembering, as well as manually inputting, destination telephone numbers in order to reply to voice mail messages, or to forward the voice mail messages. The requirement of manual key inputs is not only an annoyance for voice mail users who do not have the destination telephone numbers readily available, but may also result in voice mail users putting themselves in unsafe conditions, for example if a voice mail user inappropriately attempts to use the keypad of a cellular telephone while driving a vehicle.

Personal electronic directories (PED) have been developed that enable subscribers to access personal directories. For example, U.S. Pat. No. 5,204,894 to Darden, the disclosure of which is incorporated in its entirety herein by reference, discloses a central office based service and apparatus where subscribers may call a special number from any DTMF telephone to access their personal directory. The PED provides subscribers the ability to store names and numbers through audio signals which are preferably the subscriber's voice. In particular, the PED subscriber accesses a voice response unit (VRU), and adds an entry by speaking the first four letters of the name to be stored, followed by speaking the full name, and then speaking the individual digits of the telephone number. The subscriber then may access his PED remotely from any DTMF telephone and have a requested name and number repeated back in the subscriber's own voice by spelling the first four letters of the requested name. As an option the subscriber may have the number automatically dialed.

The Darden system, however, recognizes only clearly spoken letters or numerals, as opposed to spoken names. Moreover, the personal electronic directory requires a user to input individual names and numbers: its scope is limited to those numbers and names input by the user, and does not include the telephone number listings associated with generalized directory systems.

Automated directory assistance systems have been developed that have speech recognition capabilities. Such automated directory assistance systems are beneficial in minimizing the necessity on operator intervention. Examples of automated directory assistance systems are described in U.S. Pat. No. 5,638,425 to Meador, III et al., and U.S. Pat. No. 5,553,119 to McAllister et al., the disclosures of which are incorporated in their entirety by reference. Meador, III et al. discloses a mechanized directory assistance system for use in a telecommunications network, where a caller's response is recognized using various recognition devices; once a match having a satisfactory probability level is obtained, the match is used to access a database for the corresponding telephone number.

Despite the foregoing, voice mail users having a need to obtain a destination number for an intended recipient of a voice mail message (e.g., a forwarded message) must still suspend the voice response session with the voice response unit of the voice mail system in order to obtain the destination number. Regardless of whether the subscriber uses a personalized directory (e.g., as described in Darden), a conventional operator-assisted directory assistance system, or an automated directory assistance system as disclosed in Meador, III et al. or McAllister et al., the voice mail subscriber must access the destination telephone number from the accessed directory, write down the number (or attempt to remember the number) retrieved by the directory system, and return to the voice mail system to enter the destination number.

This problem of obtaining a destination number, or a destination address, becomes more severe as systems are integrated to perform multiple operations in addition to voice mail services. For example, U.S. Pat. No. 5,193,110 (hereinafter the '110 patent), the disclosure of which is incorporated in its entirety herein by reference, relates to an integrated services platform for providing a number of different types of services through a telephone network. The integrated services platform shown in FIG. 1 of the '110 patent connects to a central office 20 or some other point in a public switched telephone network. The platform includes a digital switch 26 and a master control unit 24, both of which connect to the central office 20. The connection between the master control unit 24 and the central office 20 carries various call related data. The connection between the digital switch 26 and the central office 20 can be T1 or ISDN. The digital switch 26 provides selective connections between channels on the T1 or ISDN link to the central office 20 and a multiplicity of applications processing units $30_1$ to $30_n$.

The '110 patent describes the modification of the standard voice mail system to permit additional access to other types of services, such as FAX mail. The application processing units 30 therefore are specially adapted to provide a variety of different types of information services which are compatible with telephone network transmission. The illustrated application processing units include a speech recognition processing unit, a speech synthesis processing unit, a FAX processing unit, an E-mail processing unit, a voice processing unit, and a videotex processing unit. Each processing unit may provide a single type of information service as illustrated, or each processing unit may provide a number of different types of information service via different ports on the processing unit.

When a call comes in to the integrated services platform, the master control unit 24 receives information about the call from the central office 20. For example, the central office 20 informs the master control unit 24 of the number called by the calling party. Alternatively, the caller can be provided with a voice menu and instructed to select the desired information service by pressing buttons on a Touch Tone telephone 21 or 23. The master control unit uses the information received from the central office and/or the received Touch Tone inputs from the caller to identify the particular type of service the caller is requesting and instructs the digital switch 26 to route the call to the appropriate processing unit 30 and/or to an appropriate port on one of the processing units.

The system of the '110 patent, however, does not contemplate the problems associated with the recipient of the message needing to reply to the message. In the case of a voicemail system, the requirement that a voice mail user needs to obtain the desired destination telephone from the directory assistance system, followed by manual input of the destination telephone number into the voice mail system for forwarding the stored voice mail message, results in inconvenience to the voice mail user, and a greater probability of errors due to recording the wrong number or pressing the wrong key.

Moreover, integrated services such as facsimile and e-mail have limited utility unless the subscriber receiving the facsimile, e-mail, etc. is able to obtain addressing information to reply to the received message, or forward the received message to another destination or destinations.

DISCLOSURE OF THE INVENTION

There is a need for an arrangement that enables a subscriber of a voice-responsive system to access addressing information for a destination party, where the voice-responsive system selectively accesses a directory database based on the destination address type requested by the subscriber. For example, there is a need for a voice-responsive system enabling a user to selectively obtain voicemail telephone numbers, facsimile telephone numbers, electronic mail (i.e., e-mail) addresses, Internet Web Page addresses, and the like, based on the type of destination address desired.

There is also a need for an arrangement that enables an originating voice-responsive message system, having a message for transmission to a destination party, to obtain a destination address for the destination party, regardless of whether the destination address corresponds to a destination telephone number, a destination facsimile number, or a destination e-mail address. More particularly, there is a need for an arrangement enabling the originating voice-responsive message system to access public and/or private database systems, including personal directory systems, to obtain the destination address.

These and other needs are attained by the present invention, where a unified message platform system integrates voice recognition and dialing capabilities with directory systems to enable a user to access stored directory information related to an intended recipient of a message. The directory systems include automated telephone directory systems and private database directory systems, to enable a user to access stored directory information related to an intended recipient of a message.

The access routine by the calling party, also referred to as the subscriber, accesses the unified message platform system by calling a prescribed telephone number. The originating central office switching system serving the calling party initiates a line-sided connection to the unified message platform system. The unified message platform system initiates an interactive voice session with the calling party. During the interactive session, the calling party is prompted to speak the name of the party intended as the recipient of a message, and the type of address information to be accessed, for example fax number, e-mail address, home address, etc. The unified message platform system analyzes the input speech information, and determines the appropriate database to be accessed based on the processed speech inputs.

The unified message platform system then accesses either local directory databases within the unified message platform system, or remote directory databases to obtain the destination address based on the destination address type. The unified message platform system includes interfaces for both telephone signaling and packet data networks. Hence, the unified message platform may access a database via a public switched telephone signaling network, or via a local area or wide area packet switched network. If necessary, the unified message platform system also interacts with the remote directory databases to ensure compliance with any security protocols of the remote directory databases. The unified message platform, upon obtaining the requested information, either announces the information in an audible format, or uses the requested information, for example to place a call to the station corresponding to the requested information.

According to one aspect of the present invention, a voice-responsive messaging system is configured for initiating a transfer of a message based on retrieval of a destination address corresponding to a selected destination address type. The system includes a voice processing unit configured for recording a destination party identity and a destination address type, spoken by calling party, for a corresponding message. A speech recognition unit outputs data corresponding to identified words spoken by the calling party. A master control unit then generates a destination address query for an identified directory database in response to identification of the destination party identity and the destination address type by the speech recognition unit. In response to receiving a destination address reply from the identified directory database, the master control unit selectively initiates a transfer of the message to the destination party based on the destination address reply.

Another aspect of the present invention provides a telecommunications network. The telecommunications network includes a central office switching system configured for receiving a line-sided connection with a calling party, and a unified message platform system. The unified message platform system includes a speech recognition unit for identifying a destination party identity and a destination address type based on respective speech samples supplied by the calling party. The unified message platform outputs a destination address query based on the destination party identity and the destination address type to a directory database. The directory database stores destination addresses for respective destination parties based on destination address type. The directory database generates a directory response based on reception of the destination address query, and outputs the directory response back to the unified message platform via a data network.

Still another aspect of the present invention provides a method in a switched communications network for obtaining a destination address based on the processing of speech samples. The method includes connecting a calling party via a line-sided connection to an originating central office switching system serving the calling party. Speech samples spoken by the calling party on the line-sided connection are then processed using speech recognition techniques to identify a destination party and a destination address type, where the destination address type corresponds to a destination address to be utilized by the calling party for access to the destination party. A directory database is then accessed via a data network for retrieval of the destination address corresponding to the destination party and the destination address type.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

Reference is made to the attached drawings, wherein elements having the same reference numeral designations represent like elements throughout and wherein.

BEST MODE FOR CARRYING OUT THE INVENTION

Figure 1:
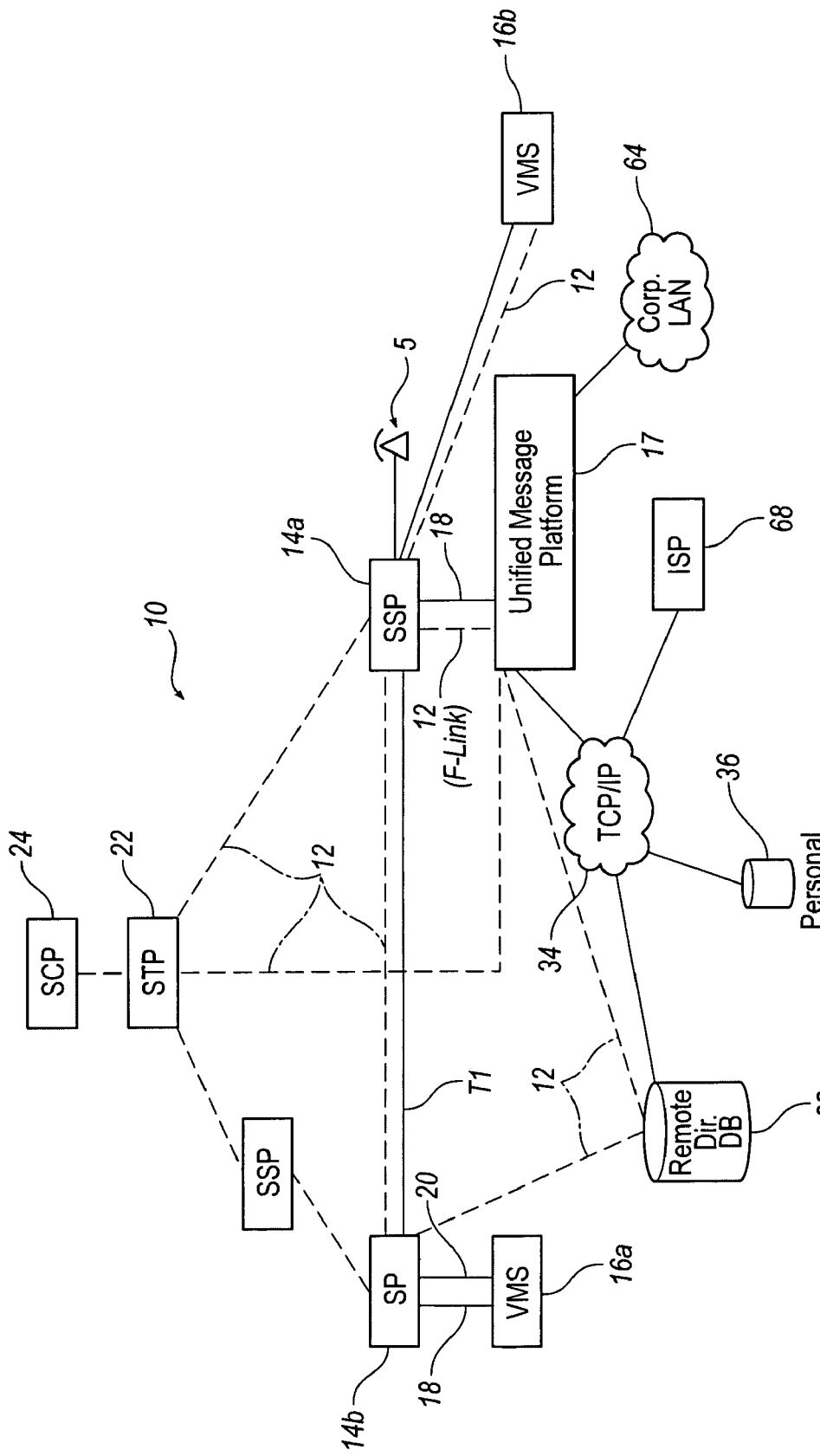
FIG. 1 is a block diagram of a telecommunications network having a unified message platform configured for communicating with an directory database systems for retrieving stored destination address information according to an embodiment of the present invention.

The disclosed embodiments are directed to a integrated voice processing systems, referred to as unified message platform systems, capable of establishing a communication link with a remote directory database, for example an automated directory assistance system or a directory database accessible by a server via a packet switched network. The unified message platform system accesses the remote directory database to obtain destination address information for an identified destination party according to a destination address type.

In particular, conventional directory assistance systems prompt a calling party to speak a location, for example a city, and then a name. The calling party's responses are recorded, and then an operator accesses directory assistance systems using the recorded responses. Such systems have been limited to accessing telephone numbers of telephone subscribers, and possibly their home addresses.

According to the present invention, the unified message platform system includes speech recognition capabilities to determine the destination party. Moreover, the unified message platform system is configured for accessing different databases based on the nature of the destination address requested by the calling party. For example, a subscriber may wish to obtain a certain type of destination address, for example an e-mail address, fax number, voicemail telephone number, cellular telephone number, etc. for a destination party. Since the information for a destination party may be distributed on different databases based on the type of destination address, the unified message platform system accesses the appropriate database based on the destination party's name and the type of destination address sought. Similarly, a user desiring to forward a message to a destination party may cause the unified message platform to obtain the appropriate destination address based on the message type, such that a fax number is obtained for a fax message, an e-mail address is obtained for an e-mail message, etc.

The unified message platform system, upon determining the type of destination address requested by the calling party or the message type to be forwarded by the calling party, accesses a database directory based on the destination address. In cases where an e-mail address or the like is needed, the unified message platform may access public directories managed by Internet Service Providers (ISPs) on the Internet, or corporate directories providing limited or secure access via a packet switched network, such as a local area or wide area network. In other cases, the directory database may reside on a user's personal computer that grants access rights to other users on the local area network.

Hence, the unified message platform determines a destination party identity and a destination address type for a calling party. The unified message platform then uses this information to determine the most appropriate directory database to access for retrieval of the requested information. In some instances, multiple queries may be output to different directory databases to provide an optimum match. Once the unified message platform retrieves the database reply containing the destination address, the unified message platform may either announce the destination address to the calling party during the voice call, or alternately use the destination address to forward a message to the destination party.

Network Overview

FIG. 1 is a block diagram illustrating a public switched telephone network 10 and a common channel interoffice signaling (CCIS) network 12 (e.g., SS7) used to carry the signaling for the switched telephone network. The switched telephone network 10 includes a series of central offices 14, for example signaling points (SP) or service switching points (SSP). The term "signaling points" refers to central offices that do not necessarily have the requisite capabilities for performing AIN queries; as such, SPs are distinguishable from SSPs, which have AIN capabilities. Each end office switching system 14 may be a local or "end office" type switch, such as a 1AESS or 5ESS switch sold by AT&T. The telecommunications network of FIG. 1 also includes voice mail systems (VMS) 16a, 16b, and a unified message platform 17. As described below, the unified message platform 17 and the voice mail system 16b includes signaling capabilities to send query messages and receive routing information related to recorded messages to be sent to a destination. At a minimum, the unified message platform 17 may receive voice calls over a multi-line hunt group (MLHG) 18 under the control of control signals communicated via the simplified message desk interface (SMDI) link 20, as shown with respect to VMS 16a.

The signaling network 12 also includes a signaling transfer point (STP) 22. Each STP in a network is connected to the SSPs, the SPs and the SS7-capable nodes by A links. The STP 22 is configured for transporting signaling messages between different signaling nodes in the SS7 network. If desired, the STP 22 may include a database for storing call processing control information. Specifically, U.S. Pat. No. 5,518,177 to Farris et al., the disclosure of which is incorporated in its entirety herein by reference, discloses an Integrated STP (ISTP) having a database storing call processing control information, which is adapted to trigger access to records within that database in response to signaling messages when certain conditions are met. Hence, the switch 14a or an SS7-capable node such as the VMS 16b or the unified message platform 17 can send a TCAP query message via the SS7 signaling network 12 to the STP 22, where the STP responds to the TCAP query message by supplying the necessary routing information to the originating voice mail system 16 based on the destination telephone number. Additional details regarding accessing a database within an STP 22 by an SS7-capable voice mail system are disclosed in commonly assigned, copending application Ser. No. 08/997,538, filed Dec. 23, 1997 entitled "Voice Mail System for Obtaining Routing Information from Signaling Nodes", the disclosure of which is incorporated in its entirety herein by reference.

As described above, the signaling network 10 may be implemented in various forms. For example, the signaling network 10 may be implemented as an advanced intelligent network (AIN), that includes a service control point (SCP) 24 as a centralized node in the network, used to obtain call processing information for voice mailbox transfers, described below.

AIN conventionally provides services based on feature logic and data located at a centralized node in the network, such as a Service Control Point (SCP). Appropriately equipped switches in the network, known as Service Switching Points (SSPs), communicate with the SCP and together they provide various AIN services. The SSP knows which calls require AIN service based on characteristics of the call, such as the line it originated from or the digits that were dialed. The process of identifying calls that require AIN processing is known as "triggering", since a particular characteristic of the call "triggers" to switch into providing AIN treatment. Once a trigger occurs, a query message is sent to the SCP asking for instructions. Based on information contained in the query message, the SCP determines which service is being requested and provides appropriate information such as routing and billing instructions that the SSP then executes to complete the call. Only the SCP "knows" which service is being performed on a particular call. The SSP simply knows how to identify calls that require AIN processing and how to execute instructions provided by the SCP. For this reason, two services that are very different from the viewpoint of the subscriber and the SCP may appear identical to the SSP since it performs the same basic functions for both.

Figure 2:
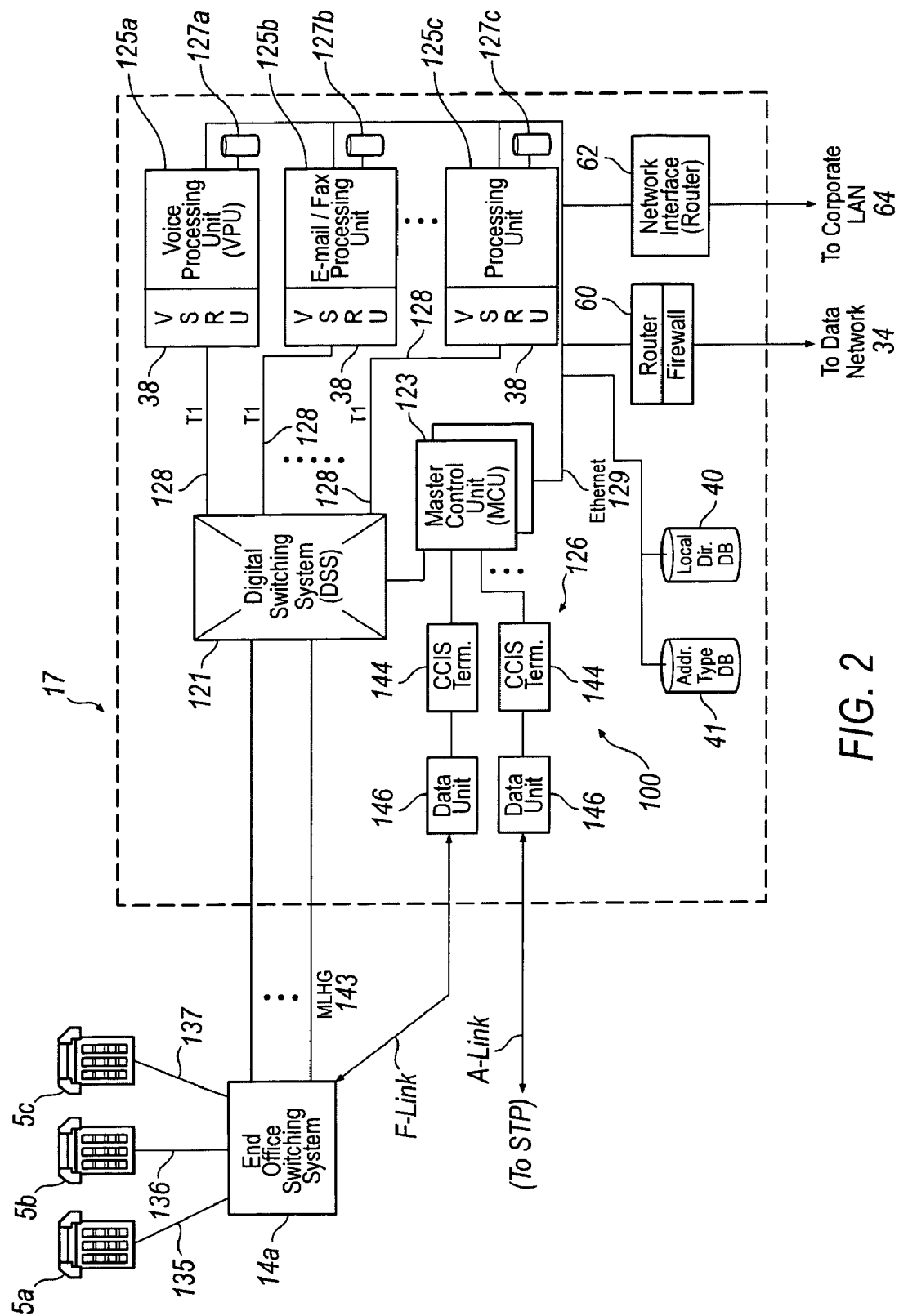
FIG. 2 is a block diagram illustrating in detail the unified message platform system of FIG. 1.

The telecommunications network includes an unified message platform 17, shown in FIG. 2, that includes a voice/speech recognition unit (VSRU) 38 for identifying directory listings based on supplied speech samples. The unified message platform 17 includes a digital switching system 121 for connecting incoming line-side connections from the switch 14a to one of a plurality of voice processing units (VRU) 125. The switch 14a is connected to the unified message platform 17 by conventional trunk lines, for example T1 lines having appropriate signaling capabilities, for example SMDI links or PRI links.

The unified message platform 17 also includes a controller 123, also referred to as a master control unit (MCU), for controlling operations of the unified message platform 17. In particular, the MCU 123 controls the switching of the digital switching system 121 to route incoming calls to an available voice processing unit 125. The incoming caller may also request a specific processing unit for a selected platform, for example e-mail, facsimile, data, etc., causing the MCU 123 to control the DSS 121 to connect the caller to the appropriate platform.

As shown in FIG. 2, each processing unit 125 is associated with a voice/speech recognition unit (VSRU) 38, which serves as a front end for the corresponding processing unit 125 to enable voice-responsive interaction between the calling party and the processing unit 125. The unified message platform 17 also includes a local directory database 40 storing telephone numbers, facsimile numbers, e-mail addresses, Internet web-page address in the form of Uniform Resource Locators (URLs) etc., for a group of subscribers served in a prescribed region of the telephone network, a local data network 129 such as an Ethernet (IEEE 802.3) network for transporting voice data such as identified names and destination address types processing units 125 and the MCU 123. The local network 129 also controls routing of query messages to and from the controller MCU 123 to network interfaces. For example, a query may be sent via the packet switched data network 34, such as the Internet, to a remote database via a network interface. The network interface 60 may be implemented as a router that sends and receives data packets according to Internet Protocol. In addition, the network interface 60 may include a firewall 62 that controls security access to the unified message platform 17 and the local network 129.

The unified message platform also includes a network interface 62 for access of a corporate network 62, for example a local or wide area network managed by the service provider of the unified message platform 17.

The unified message platform may also include a second database 41 storing routing information for accessing other databases based on the destination address type, such that e-mail destination addresses are searched at one specified remote database, whereas facsimile or work addresses are searched at another specified remote database.

As described below, the unified message platform 17 may utilize the SS7 network to perform database queries using TCAP query messages.

SS7 Overview

A detailed explanation of the SS7 protocol may be found in Bell Communications Research, "Specification of Signaling System Number 7," Generic Requirements, GR-246-CORE, Issue 1, December 1994, the disclosure of which is incorporated herein in its entirety by reference. A summary description of the most relevant aspects of SS7 appears below.

For SS7, typical applications layer protocols include Transaction Capability Application Part (TCAP); Operations, Maintenance, Application Part (OMAP); and ISDN User Part (ISDN-UP). TCAP provides the signaling protocols for exchange of non-circuit related, transaction-based information, and has typically been used for accessing AIN databases such as Service Control Points (SCPs) in Advanced Intelligent Networks, described above. For example, TCAP specifies the format and content of an initial query message from an SSP to an SCP and various response messages from the SCP back to the SSP. ISDN-UP is the actual call control application protocol of SS7. ISDN-UP specifies the procedures for setting up and tearing down trunk connections utilizing CCIS signaling. ISDN-UP messages, for example, include an Initial Address Message (IAM) type query, and Address Complete Message (ACM) and Answer Message (ANM) type response messages.

SS7 specifies an Application Service Part (ASP) for performing the functions of the presentation, session and transport layers for the TCAP and OMAP protocols. The lower four layers of the SS7 protocol correspond to the lower three layers (network, link and physical) of the OSI model. The lower three layers of the SS7 protocol, the network layer, the signaling link layer and the data link layer, form the Message Transfer Part (MTP) of SS7. The MTP is common to messages for all applications and provides reliable transfer of signaling messages between network nodes. The MTP relays messages between applications running at different nodes of the network, effectively like a datagram type service.

The SS7 network layer (lower portion of L3) routes messages from source to destination. Routing tables for the signaling network layer facilitate routing based on logical addresses. The routing functionality at this layer is independent of the characteristics of particular links.

The signaling link layer (L2) performs flow control, error correction and packet sequence control. The signaling data link layer (L1) is the actual physical connection between nodes of the CCIS network. The signaling data link layer in CCIS provides full duplex packet switched data communications. The signaling data link layer element provides a bearer for the actual signaling message transmissions. In a digital environment, 56 or 64 Kbits/s digital paths carry the signaling messages between nodes, although higher speeds may be used.

At the equivalent of the OSI network layer (L3), the SS7 protocol stack includes a Signaling Connection Control Part (SCCP) as well as the network layer portion of the MTP. SCCP provides communication between signaling nodes by adding circuit and routing information to SS7 messages. The SCCP routing information serves to route messages to and from specific applications. Each node of the signaling network, including the various switching offices, transfer points, voice mail systems with SS7 capabilities, and databases in each network, is assigned a 9-digit point-code for purposes of addressing signaling messages through the CCIS network. Both the SCCP protocol and the MTP processing utilize these point codes. It will be helpful to consider the format of SS7 messages and particularly the routing information contained in each message.

The SS7 messages traverse the network at all times. The messages themselves comprise digital serial messages that come into the various signaling points. The first byte or octet of the SS7 message packet is a flag, which is a zero followed by 6 ones and another 0. This constitutes a unique bit pattern in the SS7 protocol. The protocol ensures that this particular pattern is not repeated until the next message. This provides a flag at the beginning of a new message. A flag at the end of a message is also provided usually in the form of the flag at the beginning of the next message, i.e., a message usually contains only one flag. The message is arranged in 8 bit bytes or octets. These octets represent the information carried by the message. The message contains both fixed and variable parameters. The Message Transport Part (MTP) of the SS7 message is always in the same place. The values change but the MTP is always in the same place.

Octets 2–11 form a routing label. Octet 12 contains a signaling link selection (SLS) byte used to select specific links and/or determine the extent to which the network can select specific links to achieve load sharing. Octet 13 contains a Customer Identification Code (CIC) which typically is used to select an interexchange carrier. Octet 14 contains a message type indicator, and octets 15–N contain the actual message, in the form of fixed parameters, mandatory parameters and optional parameters. The length of the mandatory parameters field and the optional parameters field are variable. There would be 16 other bits that have Cyclic Redundancy Codes (CRCs) in them and another flag which would constitute the end of the SS7 message (and typically the start of the next message). CRCs constitute a further error detection code which is a level 1 function in the protocol.

The routing label of the SS7 message packet will now be described. The first 7 bits of octet 2 constitute the Backward Sequence Number (BSN). The eighth bit is the Backward Indicator Bit (BIB) which is used to track whether messages have been received correctly.

For example, if SSP 14a in FIG. 1 sends a message to SP 14b, SSP 14a includes a Forward Sequence Number (FSN) in the 3rd octet of its message. Upon receiving this message, SP 14b will include a Backward Sequence Number (BSN) equal to the FSN sent in the previous message in its next message to SSP 14a. This indicates to SSP 14a that SP 14b received the first message. This constitutes a positive acknowledgment of receipt of a message.

If the eighth bit of the second octet or Backward Indicator Bit (BIB) is inverted, it indicates a failure to receive the identified message. If the 8th bit in the 2nd octet, Backward Indicator Bit (BIB), is inverted, it tells the receiving node that the identified message was not received. The accompanying BSN represents the last message that was received. The receiving node will then invert its Forward Indicating Bit (FIB), 8th bit of the 3rd octet, acknowledging a retransmission remission request, and will begin to send the missing messages until the transmitting end successfully acknowledges all remaining messages, i.e.:

SSP 14a sends a message with a FSN of 5 to SP 14b;
SP 14b transmits a message back to SSP 14a with an inverted BIB and a BSN of 2, indicating that was the last message it received;
SSP 14a then inverts its FIB and retransmits message 3;
if SP 14b acknowledges this message correctly (BSN of 3) SSP 14a will retransmit message 4 and then 5.

Thus between the BIB and FIB and BSN and FSN, the STP keeps track of all of the messages sent between the two nodes at each end of a link. This provides predictability. If a node fails to receive an acknowledgment within a predetermined period of time it will take the link out of service because it is receiving no acknowledgments. This is usually a short period of time such as 1.6 seconds.

Every 8 bits represents another part of the message until the end of the message. At about the fourth octet there is a length indicator to indicate the length of the message. In this case the message is bad in that it indicates six which is not a complete message. Assuming a complete message where the length indicator indicates 23 octets, this provides another means for error detection. Thus if the recipient counts to 28 this indicates that something is wrong and the message is sent again.

Octet 5 is the Service Information Octet (SIO). This indicates whether it is a Fill In Signal Unit (FISU), Link Service Signaling Unit (LSSU) or Message Signaling Unit (MSU). MSUs are the only ones used for setting up calls, LSSUs are used for alignment, and FISUs are fill in signals. The MSU indicator type SIO octet is formatted and encoded to serve as an address indicator, as discussed below.

The routing label includes fields for both destination related addressing and point of origin addressing. Specifically, octets 6–11 contain the point codes, where the destination or 'called party' address includes octets 6, 7 and 8. Octets 9–11 carry origination point code (OPC) information, for example member, cluster and network ID information.

The three octets of the called party address contain an actual destination point code (DPC) identified as DPC-member, DPC-cluster and DPC-network ID information. In operation, the translation tables stored in a transfer point such as the STP 22 or in an ISTP cause the transfer point to actually route based on the DPC without translating any of the DPC octets into new values. In the case of an ISTP, the called party address octets (6–8) may carry other types of called party addressing information and receive different treatment by the ISTP. For example, these octets may carry a global title (GTT) and subsystem number (SSN) information. A transfer point utilizes a stored translation table to translate the GTT and SSN into an actual DPC, substitutes that DPC for the information in octets 6, 7 and 8, and then routes the message based on the DPC. Under certain circumstances, the ISTP will process application layer information from the SS7 message to determine whether to route or respond to the message. If the ISTP routes the message, the ISTP uses the actual DPC.

To distinguish the types of information carried in octets 6–8, the MSU type service information octet (5) contains an address indicator. For example, a '1' value in the first bit position in this octet signifies that the called party address octets contain a subsystem number, a '1' value in the second bit position in this octet signifies that the called party address octets contain a signaling point code. The third, fourth, fifth and sixth bits of the address indicator serve as the global title indicator and are encoded to identify the presence and type of global title value in octets 6–8.

Additional details regarding SS7 signaling are disclosed in the above-incorporated U.S. Pat. No. 5,631,948 to Bartholomew et al., and in U.S. Pat. No. 5,586,177 to Farris et al., the disclosures of which are incorporated in their entirety herein by reference.

TCP/IP Network

The unified message platform 17 may also send destination address queries in the form of a database query to a remote database 32 or 36, or to an Internet Service Provider (ISP) 68 via a TCP/IP network 34, such as the Internet. "Internet" refers to the global information system that is (i) logically linked together by a globally unique address space based on the Internet Protocol (IP) or its subsequent extensions/follow-ons; (ii) is able to support communications using the Transmission Control Protocol/Internet Protocol (TCP/IP) suite or its subsequent extensions/follow-ons, and/or other IP-compatible protocols; and (iii) provides, uses or makes accessible, either publicly or privately, high level services layered on the communications and related infrastructure described herein. (FNC Resolution: Definition of "Internet", Oct. 24, 1995.) The TCP/IP network 34 is based on utilizing a hybrid or combination of CCIS with a data internetwork to link the signaling points (e.g., 14, 16, 22, 30, 24, 32) in a telecommunications network via the new hybrid common channel interoffice switching system. In this manner virtually immediate equipment, architecture, and protocol are made available in a form which is utilized and understood on a worldwide basis. In a preferred specific example, the Internet is relied upon to link signal switching points, signal transfer points, and a signal control point. The signal control point is preferably hierarchical and distributed so as to provide ample power and capacity to supply signal control for multiple telecommunications networks of related or unrelated operating companies. With such a signal control point or controller, it is feasible for each company using the controller to maintain control of its allocated portion or functionality of the common controller or control point without interfering with the accessibility of all or predesignated portions of the control point or controller to all users of the internetwork. Additional details regarding use of the TCP/IP network 34 for signaling communications are disclosed in commonly assigned, copending application Ser. No. 08/753,198, filed Nov. 21, 1996, entitled "Telecommunications System With Wide Area Internetwork Control", the disclosure of which is incorporated in its entirety herein by reference.

Unified Message Platform Operation

FIG. 2 is a block diagram showing in detail the unified message platform 17 of FIG. 1 according to an embodiment of the present invention. The unified message platform 17 includes voice messaging equipment such as a voice mail system 120. Although referred to as "voice" messaging equipment, equipment 120 may have the capability of storing recorded messages of a variety of different types as well as voice messages. For example, a single system 120 may receive incoming messages in the form of audible messages, such as voice messages for storage in a mass storage device 127a, as well as text format data messages. The voice messaging equipment 120 may also store messages in an image data format in a second mass storage device 127b, such as facsimile, and a third mass storage device 127c may be used to store other-format messages, such as URLs, etc. Message service systems having the capability to store messages in a variety of audible, data and image formats are known, see e.g. U.S. Pat. No. 5,193,110 to Jones et al., U.S. Pat. No. 5,008,926 to Misholi and U.S. Pat. No. 4,652,700 to Matthews et al.

The mass storage units 127, for example, may comprise magnetic disc type memory devices. Although not specifically illustrated in the drawing, the processing units 125 also include appropriate circuitry to transmit and receive audio signals via T1 type digital audio lines.

An ETHERNET or IEEE 802.3 type digital data network 129 carries data signals between the MCU 123 and the processing units 125. The Ethernet network 129 also carries stored messages, in digital data form, between the various processing units 125. The system 120 further includes T1 type digitized audio links 128 between the DSS switch 121 and each of the processing units 125.

The system 17 also includes an SS7 signaling interface 127 enabling generation and transmission of TCAP query messages, as well as reception of SS7 signaling messages from the end office switching system 110 or any other SS7 signaling node. The SS7 signaling interface 127 includes a CCIS terminal 144 and an associated data unit 146 that provides an SS7 signaling link between the master control unit 123 and a selected signaling node on the SS7 network, for example the remote directory database 32, the STP 22, the SCP 24, or a SS7-capable VMS. Although two such links are shown, preferably there are a plurality of such links providing redundant connections to STPs of a mated pair and/or an end office switching system 14. These links provide sufficient capacity to carry all necessary signaling to and from the particular system 17.

The SS7 signaling through the CCIS terminal 146, the data unit 144 and the selected signaling node provides two-way signaling data transport for call set-up related messages to and from other offices for receiving a message (live or recorded) for storage in the voice mail system 120, two-way data transport of messages related to identifying a destination telephone number using speech recognition, or transmitting a recorded message to another voice mail system, described below. These call set-up related messages typically utilize the ISDN-UP (ISDN-users part) protocol portion of SS7. The SS7 signaling through the terminal 146, the data unit 144 and the STPs also provides two-way signaling data transport for communications between the VMS 120 and SPs storing subscriber profiles, such as End offices and ISTPs, described below. The communications between the unified message platform 17 and the database systems in the SPs utilize the TCAP (transactions capabilities applications part) protocol portion of SS7.

In various operations discussed in more detail below, calls can be forwarded to the system 120 in response to calls to subscriber's lines 135, 136, or 137 received by end office switching system 14 and that subscribe to voice mail capabilities or fax mail capabilities. The switching system 14 may also route some calls directly to the system 120 in response to callers 5a, 5b, or 5c dialing a telephone number assigned to the lines 143 going to the system 120. When the end office switching system 14 directs a call to the system 120, either as a forwarded call (busy or no answer) or as a direct call in response to dialing of a number for accessing the system 120, the switching system places the call on any available channel on the multi-line hunt group (MLHG) lines 143. Although FIG. 2 shows only a single end office connected to the system 17, the system 17 may be connected to a plurality of end offices 120 via respective MLHG lines.

The TCAP protocol provides standardized formats for various query and response messages. Each query and response includes data fields for a variety of different pieces of information relating to the current call. For example, an initial TCAP query from an SSP includes among other data a "Service Key," such as the calling party's address, and the digits dialed by the caller. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits. In accord with the invention, the MCU 123 is also capable of generating TCAP query messages, particularly to obtain routine information for transmitting a voice mail message to a remote VMS, as described below.

Database Queries

Figure 3:
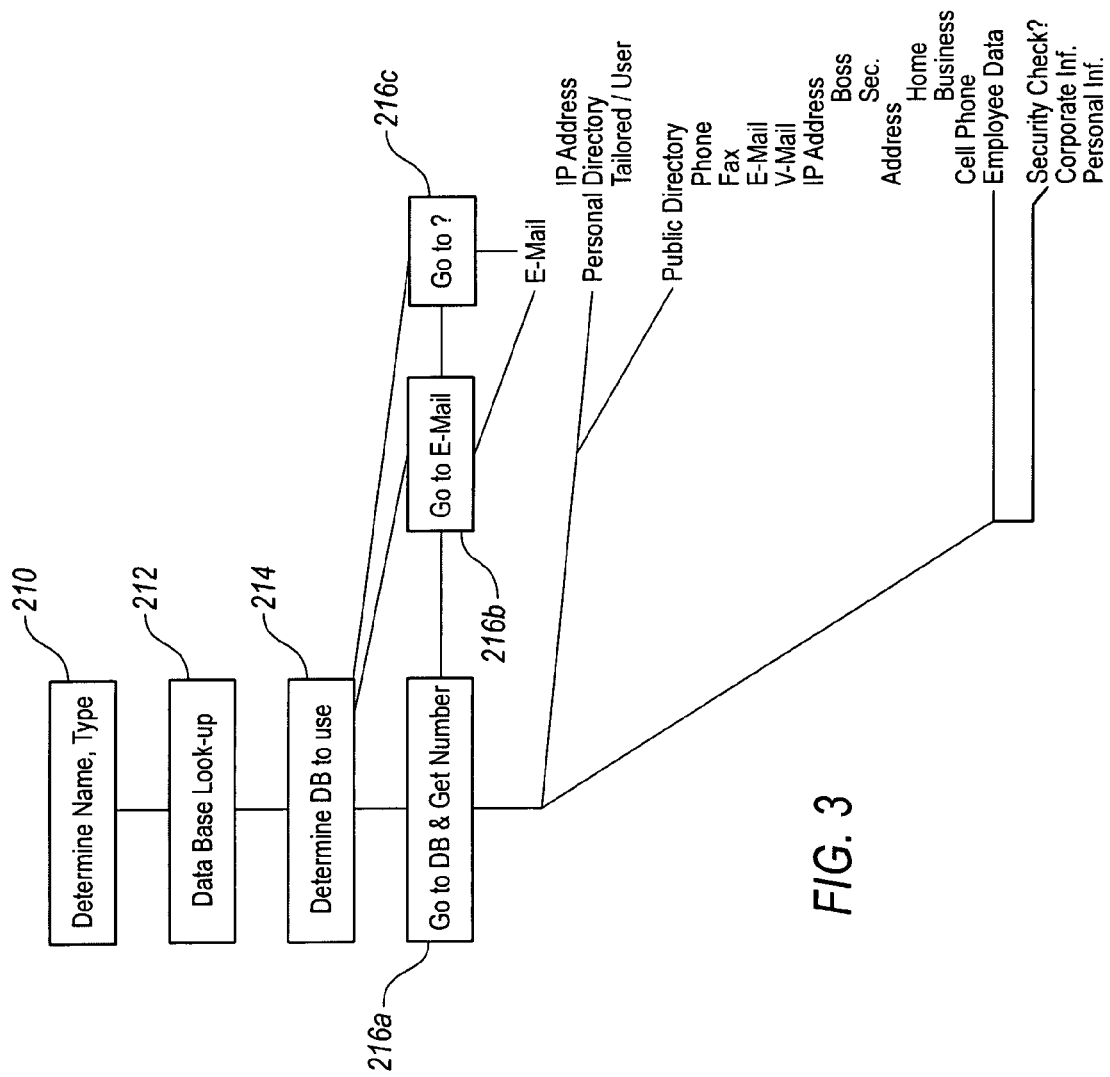
FIG. 3 is a diagram illustrating a method in the unified message platform for retrieving a destination address based on the destination address type according to an embodiment of the present invention.

FIG. 3 is a diagram illustrating a method utilizing a directory tree by the processing units 125 and the MCU 123 during an interactive voice session with a user to formulate a destination address query from a remote database according to an embodiment of the present invention. The process usually begins by a subscriber (i.e., the calling party) accessing the unified message platform 17 in order to record a message to be transmitted to a destination party, typically in the form of a voice mail message, an e-mail message, a pager message, or a facsimile message. However, the subscriber may simply access the unified message platform 17 in order to obtain the telephone number, e-mail address, fax number, pager number, etc. for subsequent use by the subscriber independent of the message platform 17.

The processing unit 125, upon establishing a line-sided connection with the subscriber, may operate its voice menu via the corresponding VSRU 38 to direct the caller to record a destination party name or identity, and depress a specified key when done. Once the destination party identity has been recorded and identified by the VSRU 38, then a directory identifier (i.e., destination address type or message type) for the called party identity may also be requested, for example by prompting the calling party with the prompt "what city" for a geographic directory, or alternately "what company directory" for access to different corporate directories, or "what type of address or message type".

The recorded called party identity and the directory identifier are then identified by the VSRU 38 in step 210 using known speech recognition techniques. For example, the recorded speech (e.g., called party identity or directory identifier) can be analyzed by a word-recognizer process or a phoneme-recognizer process. The word-recognizer process produces a list of three or more word candidates, with confidence or probability figures, referred to as W-scores. The probability figure indicates the probability that a particular choice of a candidate word is correct. If the first word candidate from the word-recognizer has a probability value which is above some chosen threshold, then the process is terminated and the word candidate is chosen for processing with the remainder of the directory inquiry. However, if the candidate word does not have a sufficiently high probability value above the prescribed threshold, then the second phoneme-recognizer process is used.

Specifically, each candidate word is linked to a set of one or more "standard" phoneme strings, which have been stored in a reference file, in alphabetic (ASCII) form. This set of standard phoneme strings is produced using one, or possibly two, methods. The first method produces precisely one string, referred to as the "phoneme label string" for the referenced candidate word, and is derived from the spelling of the word. The second method produces one or more phoneme strings, using experimental utterances by a panel of typical speakers. There may be two or more of such strings, as different pronunciations may have been found in the relevant demographic community. The second method is appropriate for an application where there is a limited number of names, for example cities. Additional details regarding word recognition for use in automated directory assistance systems may be found in the above-incorporated U.S. Pat. No. 5,638,425 to Meador, III et al., and U.S. Pat. No. 5,553,119 to McAllister et al.

Following the identification of the recorded called party identity and/or the directory identifier by the speech-recognition unit 38, a database lookup is performed by the MCU 123 in step 212 from the local directory database 40 to determine if the requested address information is available locally. Assuming the database 40 does not have the necessary information, the MCU 123 accesses the address type database 41 in step 214 to determine which database to access for the requested information. In particular, the address type database 41 maintains a registry of all available databases and the types of destination addresses stored in the respective databases. For example, the SCP 24 may store voicemail information and/or call forwarding information, whereas the ISP 68 may manage Internet directories for retrieval of e-mail and/or hypertext-based URLs for a destination party home page. In addition, the calling party may register the TCP/IP address of his or her own personal database 36, for example a personal directory on a personal computer accessible via the network 34, to enable the calling party to remotely access his or her personal directory 36 for destination address information, such as a comprehensive listing of telephone numbers, e-mail addresses, cellphone numbers, pager numbers, home addresses, etc. for personal friends or business contacts. Hence, the calling party may register his or her personal database 36 to enable remote access by the unified message platform 17.

Once the MCU 123 in the unified message platform 17 has determined in step 214 which database to access for the appropriate address type or message type, the MCU 123 generates a database query that requests a destination address for the specified destination party and corresponding to the specified destination address type. The database query is then sent to the appropriate database in step 216 for retrieval of the requested information via either the SS7 network 12 or the TCP/IP network 34.

As shown in FIG. 3, numerous search criteria may be used by the MCU 123 in querying different databases via the SS7 network 12 or the TCP/IP network 34, depending on the nature of the query selected by the calling party. The MCU 123 may use recursive queries, sending a plurality of queries until a satisfactory reply is received, or until a predetermined time interval expires, for example ten to twenty seconds.

Once the MCU 123 retrieves the destination address, the MCU 123 may then announce the destination address to the calling party, or alternately initiate transfer of a message stored in one of the mass storage devices 127 using the retrieved destination address.

According to the disclosed embodiment, a unified message platform is configured for establishing a link with an directory database systems based on context information, including the type of destination (i.e., the type of message to be sent). Hence, a subscriber can obtain any type of destination address for a destination party, using the networked databases to obtain the requested information. Moreover, the retrieval of destination address by sending a database query via either the telephone signaling network and/or the packet switched data network (e.g., TCP/IP), enables the unified message platform 17 to utilize the enormous data storage and retrieval capabilities existing in the telecommunications networks, the public data networks, and private corporate networks.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A voice-responsive messaging system comprising:
    a voice processing unit configured for recording a destination party identity and a destination address type, spoken by calling party, for a corresponding message;
    a speech recognition unit for outputting data corresponding to identified words spoken by the calling party; and
    a master control unit configured for generating a destination address query for an identified directory database in response to identification of the destination party identity and the destination address type by the speech recognition unit, wherein the master control unit, in response to receiving a destination address reply from the identified directory database, selectively initiates a transfer of the corresponding message to the destination party based on the destination address reply.

2. The system of claim 1, further comprising a signaling network interface for sending the destination address query to the identified directory database, and for receiving the destination address reply from the identified directory database, via an interoffice signaling network configured for exchanging data between the voice-responsive messaging system and the identified directory database.

3. The system of claim 2, further comprising:
    a plurality of processing units, each configured for storing and processing a message for the calling party having a corresponding message type; and
    a digital switching system for switching calls between an assigned Multi-Line Hunt Group and a selected one of the processing units, the master control unit selectively causing the digital switching system to establish a line-sided connection between the selected one processing unit and the calling party for retrieval of the message for the calling party.

4. The system of claim 3, wherein the selected one processing unit forwards the message to a destination address specified in the destination address reply in response to a forward command from the calling party.

5. The system of claim 4, wherein the selected one processing unit supplies the message to the destination address according to a corresponding message type protocol.

6. The system of claim 3, further comprising a local directory database for storing, for each subscriber of the voice-responsive messaging system, a destination party identity, a destination address, and a message type corresponding to the destination address.

7. The system of claim 6, wherein the local database stores a plurality of message types having respective destination addresses.

8. The system of claim 7, wherein the message types include a voicemail message type, an e-mail message type, and a facsimile message type.

9. The system of claim 8, wherein the processing units include a voicemail processing unit for processing the voicemail message types, and an e-mail processing unit for processing the e-mail message type.

10. The system of claim 9, wherein the e-mail processing unit is configured for processing the e-mail message type and the facsimile message type, the e-mail processing unit configured for converting messages between the e-mail message type and the facsimile message type.

11. The system of claim 6, further comprising a network interface configured for sending and receiving at least one of the destination address query and the second destination address query to the respective directory databases via a data network.

12. The system of claim 11, wherein the data network is the Internet.

13. The system of claim 11, wherein the master control unit outputs, via the data network, security information to at least one of the directory database and the second directory database in response to reception of a security inquiry from the corresponding directory database.

14. The system of claim 3, wherein at least one of the processing units includes a network interface for communication with a packet switched network.

15. The system of claim 1, wherein the master control unit is configured for initiating a second destination address query for a second identified directory database in response to the destination address reply from the identified directory database.

16. A telecommunications network comprising:
a central office switching system configured for receiving a line-sided connection with a calling party;
a unified message platform system comprising a speech recognition unit for identifying a destination party identity and a destination address type based on respective speech samples supplied by the calling party via the line-sided connection, the unified message platform outputting a destination address query based on the destination party identity and the destination address type;
a directory database for storing destination addresses for respective destination parties based on destination address type, the directory database generating a directory response based on reception of the destination address query; and
a data network for transporting the destination address query and the directory response between the unified message platform system and the directory database according to a prescribed data network protocol.

17. The system of claim 16, wherein the directory database selectively supplies one of an identified destination address and a null result in the directory response in based on executing the destination address query.

18. The system of claim 17, wherein the unified message platform system selectively sends a message, selected by the calling party, to the identified destination address in response to reception of the corresponding directory response.

19. The system of claim 18, wherein the destination address query and the directory response are each transported via the data network as transaction capability application part (TCAP) query and TCAP response messages, respectively.

20. The system of claim 18, wherein the destination address query and the directory response are each transported via the data network according to transmission control protocol/internet protocol (TCP/IP).

21. The system of claim 16, wherein the unified message platform system further includes:
a local directory database for storing, for each subscriber of the unified message platform system, a destination party identity, a destination address, and a message type corresponding to the destination address; and
a master control unit configured for outputting the destination address query to the directory database via the data network based on a detected absence of the destination party identity in the local directory database.

22. The system of claim 21, wherein the unified message platform system further includes a plurality of processing units, each configured for storing and processing a message for each said subscriber according to a corresponding subscriber destination address and according to a corresponding message type.

23. The system of claim 22, wherein the master control unit sends a message selected by the calling party from the corresponding processing unit to the destination address corresponding to the destination party identity.

24. The system of claim 22, wherein one of the processing units supplies a destination address retrieved from the directory response based on the corresponding message type.

25. A method in a switched communications network, the method comprising:
connecting a calling party via a line-sided connection to an originating central office switching system serving the calling party;
processing speech samples spoken by the calling party on the line-sided connection to identify a destination party and a destination address type, the destination address type corresponding to a destination address to be utilized by the calling party for access to the destination party; and
accessing a directory database via a data network for retrieval of the destination address corresponding to the destination party and the destination address type.

26. The method of claim 25, further comprising forwarding a message to a destination system corresponding to the destination address according to a data protocol corresponding to the destination address type.

27. The method of claim 26, further comprising determining an identifier for the directory database, the accessing step including accessing the directory database based on the corresponding identifier.

28. The method of claim 27, wherein the identifier corresponds to at least one of a personal directory for the calling party, a public directory having a listing for the destination party, and a private directory serving the destination party.

29. The method of claim 28, wherein the private directory corresponds to one of a corporate directory listing the destination party as an employee, and a subscriber directory listing the destination party as a subscriber.

30. The method of claim 27, wherein the determining step comprises:
identifying a destination directory database based on identification for speech samples spoken by the calling party on the line-sided connection;
accessing a database for retrieval of a network address for the destination directory database, the step of accessing the directory database including accessing the directory database based on the network address retrieved from the database.

31. The method of claim 30, wherein the step of identifying the destination directory database includes selecting from a group of available directories.

32. The method of claim 31, wherein the group of available directories includes a personal directory store on a personal computer, a public directory, a corporate employee directory, an e-mail address directory, and a mailing address directory.

33. The method of claim 25, wherein the accessing step includes sending a transaction capability application part (TCAP) formatted query message requesting the destination address.

34. The method of claim 25, wherein the accessing step includes sending a transmission control protocol/internet protocol (TCP/IP) formatted message carrying a database query requesting the destination address.

35. A telecommunications network comprising:
a central office switching system configured for receiving a line-sided connection with a calling party; and
a unified message platform system comprising:
(1) a speech recognition unit for identifying a destination party and a destination address type from respective speech inputs provided by the calling party via the line-sided connection, and
(2) a directory access system for accessing destination address information for the destination party based on the corresponding destination address type, the unified message platform configured for forwarding a recorded message based on accessing the destination address information for the corresponding destination address type.

36. The network of claim 35, wherein the directory access system includes a maser control unit configured for generating a destination address query for an identified directory database in response to identification of the destination party and the destination address type by the speech recognition unit, wherein the master control unit, in response to receiving a destination address reply from the identified directory database, selectively initiates a transfer of a message to the destination party based on the destination address reply.

37. The system of claim 36, further comprising a signaling network for transporting signaling messages, the directory access system comprising a signaling network interface for sending the destination address query to the identified directory database, and for receiving the destination address reply from the identified directory database, via an interoffice signaling network configured for exchanging data between the voice-responsive messaging system and the identified directory database.

38. The system of claim 37, wherein the unified message platform system further comprises:
a plurality of processing units, each configured for storing the processing a message for the calling party having a corresponding destination address type; and
a digital switching system for switching calls between an assigned Multi-Line Hunt Group connected to the central office switching system and a selected one of the processing units, the master control unit selectively causing the digital switching system to establish a line-sided connection between the selected one processing unit and the calling party for retrieval of the message for the calling party.

39. The system of claim 38, wherein the selected one processing unit forwards the message to a destination address specified in the destination address reply in response to a forward command from the calling party.

40. The system of claim 39, wherein the selected one processing unit supplies the message to the destination address according to a corresponding destination address type protocol.

41. The system of claim 39, further comprising a local directory database for storing, for each subscriber of the voice-responsive messaging system, a destination party identity, a destination address, and a destination address type corresponding to the destination address.

42. The system of claim 41, wherein the local database stores a plurality of destination address types having respective destination addresses.

43. The system of claim 42, wherein the destination address types include a voicemail destination address type, an e-mail destination address type, and a facsimile destination address type.

* * * * *